Patented May 16, 1950

2,508,013

UNITED STATES PATENT OFFICE 2,508,013

PREPARATION OF SECONDARY CELLULOSE ESTERS

William James Burke, Marshallton, Del., assignor to E. I. du Pont de Nemours & Company, Wilmington, Del., a corporation of Delaware No Drawing. Application July 26, 1946,
Serial No. 686,446

7 Claims. (Cl. 260—230)

This invention relates to a process for the preparation of cellulose esters and more particularly to the heterogeneous preparation of cellulose mixed esters containing a high proportion of acetyl groups.

In the usual heterogeneous process for preparing cellulose acetate, cellulose is treated with acetic anhydride in the presence of acetic acid, an acetylation catalyst, and an inert organic liquid which is a non-solvent for cellulose acetate. Upon completion of the esterification, the product is readily recovered by filtration. Use of this procedure does not require special equipment for handling corrosive, viscous liquids; the excess anhydride is not destroyed; and there is no large quantity of solvent to be recovered from dilute, aqueous solutions. The esterification bath can be reused upon addition of the required quantities of anhydride and catalyst.

In contrast, homogeneous (gum) acetylation procedures do not possess these advantages. In the methods generally used commercially, cellulose is treated with acetic acid and acetic anhydride in the presence of sulfuric acid as catalyst under controlled conditions until a fiber-free gum of the desired viscosity is obtained. Hydrolysis of the resulting primary acetate is promoted by the addition of sufficient water in the form of 40% to 70% acetic acid to destroy the excess anhydride and to give the solution a water content of 7% to 15%. After 3 to 20 hours at 25° C. to 60° C., the secondary acetate is precipitated by mixing the hydrolysis solution with water or dilute acetic acid. In order for the process to be economically feasible, it is necessary to recover the acetic acid from the dilute, aqueous solutions.

Thus, heterogeneous esterification has important potential advantages over homogeneous methods with respect to simplicity of equipment, anhydride consumption, and solvent recovery. However, this type of procedure has not been used commercially, since the desired secondary esters of satisfactory quality have been obtained only when the hydrolysis was conducted in solution, i. e. in a homogeneous system.

This invention has as an object the development of a process for the heterogeneous hydrolysis of cellulose esters. A further object is the provision of a simple method for the preparation of good quality, acetone-soluble, secondary cellulose esters of high acetyl content by a procedure in which the fibrous form of the cellulosic material is maintained throughout both the esterification and hydrolysis steps. Other objects will appear hereinafter.

These objects are accomplished by the following invention in which acetone-insoluble, fibrous, primary cellulose esters containing acetyl groups, combined sulfate, and from 2% to 7% of combined carboxylic acid having at least three carbon atoms are hydrolyzed by treatment with aqueous solutions of strong acids, and the resulting fibrous, acetone-soluble, secondary cellulose esters are isolated.

The term "fibrous, primary cellulose ester" is used to indicate a substantially fully esterified cellulose ester prepared by a heterogeneous procedure, i. e., one in which the fibrous form of the cellulose is maintained throughout the esterification process.

In the preferred procedure, an acetone-insoluble, fibrous, primary cellulose acetate propionate, prepared from water activated cotton linters in a heterogeneous system in the presence of sulfuric acid as catalyst, is placed in an aqueous solution of a strong, oxygenated mineral acid and the resulting suspension is agitated at a temperature of 20° C. to 80° C. for 1 to 48 hours. The hydrolysis is continued until the product becomes soluble in acetone and is interrupted before the product reaches an acetone-insoluble stage. The resulting acetone-soluble, secondary cellulose acetate propionate is removed by filtration, pressed, washed thoroughly with demineralized water, and treated with superheated steam until the combined sulfate is removed. The detailed practice of this invention is illustrated by the following examples, in which parts are given by weight and which are illustrative rather than limitative:

EXAMPLE I

A primary cellulose acetate propionate containing combined sulfate is prepared and subjected to hydrolysis by the following procedure.

Activation step

Purified, acetylation grade cotton linters [150 parts; degree of polymerization in anhydroglucose units (DP) is 1680] are activated by soaking in water for 30 minutes, centrifuging so that the weight of water retained is about 70% of the weight of the dry linters, and replacing the water with acetic acid. The last step is readily accomplished by placing the centrifuged linters in a press, adding 1,000 parts of glacial acetic acid, and pressing the resulting product. After this procedure has been repeated three times, the water content of the linters is less than 1% of the weight of cellulose.

Esterification step

A mixture consisting of the activated cotton linters, 1,200 parts of glacial acetic acid, 600 parts of propionic acid, and 6 parts of 96% sulfuric acid (4% based on cellulose) is rotated at a temperature of 30° C. for 50 minutes in a cylindrical reactor. The reaction mixture is cooled to 15° C. and a cold (5° C.) mixture of 900 parts of acetic anhydride, 1,500 parts of purified aliphatic hydrocarbon petroleum fraction (boiling range 100° C. to 150° C.), and 600 parts of benzene is added. The reaction mixture is mechanically stirred and surrounded by a water bath at 5° C. for 30 minutes. The bath temperature is gradually raised to a maximum of 40° C. during the next hour. Samples of the fibrous product are completely soluble in glacial acetic acid at the end of 3.5 hours reaction time. The reaction is continued at 40° C. for an additional 35 minutes. The fibrous product is removed by filtration and washed free of acid with benzene, methanol, and demineralized water in that order. Mechanical losses are negligible and the yield is essentially quantitative. The acetone-insoluble, fibrous primary cellulose acetate propionate analyzes for 5.7% combined propionic acid and 0.58% combined sulfate.

Hydrolysis step

A mixture containing 10% of the above water-wet ester in 400 parts of 0.5 N sulfuric acid is agitated for two hours at 60° C. The fibrous product is removed by filtration, washed free of acid with demineralized water, and heated in steam at 125° C. for 1.5 hours. The steaming operation is conducted in a stainless steel reactor so equipped that live steam escapes through the bottom during the operation. The resulting secondary ester is sulfate-free and analyzes for 2.60 acetyl groups and 0.25 propionyl group per glucose unit. The product forms smooth, clear, viscous, readily filterable 10% to 25% solutions in acetone. Films cast from acetone solutions are clear and tough.

EXAMPLE II

Another portion (50 parts wet with water; equivalent to 27 parts of a dry basis) of primary cellulose acetate propionate prepared as described in Example I is hydrolyzed in 300 parts of N nitric acid at 30° C. for 20 hours and then isolated, washed, and steamed as described in Example I. The resulting acetone-soluble, secondary cellulose acetate propionate contains a total of 2.6 acyl groups. A solution containing 0.1 gram of this product in 100 cc. of acetic acid has a relative viscosity ($\eta r$) of 1.208. This corresponds to a DP of 390, when the Kraemer equation given below is used:

$$DP = K \frac{\ln(\eta r)}{c}$$

where $c$ is the concentration in grams per 100 cc. of acetic acid and K is 208.

EXAMPLE III

Hydrolysis of 50 parts of water-wet primary cellulose acetate propionate, prepared as described in Example I, in 300 parts of 1 N sulfuric acid at 30° C. for 20 hours, followed by filtration, washing with water, and steaming as indicated in Example I, yields a sulfate-free, acetone-soluble, secondary ester containing 0.25 free hydroxyl group per glucose unit. This indicates that under these conditions, nitric acid is a more vigorous deesterification catalyst than is sulfuric acid (see Example II).

Hydrolysis of a fibrous, primary cellulose acetate butyrate containing 5.0% combined butyric acid and 0.52% combined sulfate under the above conditions also results in an acetone-soluble secondary ester.

EXAMPLE IV

Primary cellulose acetate propionate is prepared by a procedure similar to that outlined in Example I with the exception that the esterification mixture contains 150 parts of water-activated cotton linters, 1,200 parts of acetic acid, 300 parts of propionic acid, 900 parts of acetic anhydride, 1,050 parts of benzene, 1,050 parts of purified petroleum fraction (boiling range 100° C. to 150° C.) and 6 parts of 96% sulfuric acid (4% based on cellulose). The resulting fibrous primary ester is soluble in acetic acid, insoluble in acetone, and analyzes for 3.7% combined propionic acid and 0.43% combined sulfate.

One-tenth of the above water-wet product is agitated in 400 parts of 1 N nitric acid at 30° C. for 20 hours, washed with demineralized water, heated in steam at 125° C. for 1.5 hours, washed with water, and dried. Analysis of the resulting cellulose acetate propionate indicates the presence of 0.35 free hydroxyl group per glucose unit and the absence of combined sulfate. The product has a DP of 450 and gives smooth, readily filterable, acetone solutions. Analysis of the hydrolyzed, unsteamed product shows that practically no combined sulfate is eliminated when the acyl groups are removed under the above conditions.

When the primary ester is heated in steam at 125° C. for 1.5 hours, the resulting fibrous product is free of combined sulfate. Hydrolysis of this product under the conditions outlined above results in practically no deesterification, as indicated by saponification number determinations. The product is completely soluble in acetic acid but not in acetone. When more drastic hydrolytic conditions are employed, for example, 2.5 N sulfuric acid at 100° C., so that the resulting ester contains from 0.3 to 0.5 free hydroxyl group per glucose unit, the resulting secondary ester is not only insoluble in acetone but in acetic acid, a solvent for the original primary ester. The presence of combined sulfate is, therefore, essential for hydrolysis, in an aqueous mineral acid, to an acetone-soluble secondary ester.

The fibrous, acetone-insoluble, primary, mixed cellulose esters suitable for use in this invention contain combined sulfate, a high proportion of combined acetic acid, and from 2% to 7% combined carboxylic acid having more than two carbon atoms. The mixed cellulose esters are prepared by a procedure in which the fibrous form of the cellulose is not destroyed during esterification (heterogeneous esterification). Primary, mixed esters containing in addition to acetyl groups, acyl groups having from 3 to 16 carbon atoms can be used. Primary esters in which the higher acyl group contains from 3 to 6 carbons are preferred, since they are more readily accessible and yield particularly desirable products upon heterogeneous hydrolysis. Primary cellulose acetate propionates are particularly preferred because they lead to products which are outstanding in toughness and have a higher softening temperature and better resistance to solvents of the type used in dry cleaning.

Fibrous, primary esters prepared from water-activated native cellulose, such as water-activated, acetylation grade cotton linters or wood pulp, in the presence of sulfuric acid as catalyst are preferred since they lead to good quality high molecular weight secondary esters. Although conventional heterogeneous procedures for preparing cellulose esters can be employed, the fibrous, primary esters prepared by a procedure involving the use of water-activated cotton linters are particularly preferred for use in this invention since they are readily hydrolyzed to high DP secondary esters of outstanding quality. These secondary esters give unusually clear, smooth solutions in acetone, from which fibers and films having exceptionally good physical properties can be obtained. For example, clear, bright films having thicknesses of 0.001 inch to 0.005 inch and tensile strengths from 10,000 to 15,000 pounds per square inch at 10% to 20% elongations are readily prepared from a 15% acetone solution of the secondary esters by conventional casting procedures. For best results, the fibrous, primary ester is not dried after washing but is stored in demineralized water until hydrolyzed. If the primary ester is dried, it can be subjected to a swelling agent such as ethanol and washed with water just before being hydrolyzed.

The acetone-insoluble, fibrous, primary cellulose acetate propionates containing between 2% and 7% combined propionic acid are preferred for use in this invention. Heterogeneous hydrolysis of primary esters containing less than 2% combined propionic acid results in products of limited utility since they are incompletely soluble in acetone. Use of primary esters containing more than 7% combined propionic acid results in cellulose esters of lower softening point and increased sensitivity to certain organic solvents. This is particularly objectionable in textile applications where a high safe ironing temperature and resistance to dry cleaning solvents is desirable. It is to be noted also that the preferred primary cellulose acetate propionates differ from those containing appreciably more than 7% combined propionic acid in that the latter are soluble in acetone. Furthermore, use of primary esters containing higher proportions of propionyl groups is objectionable from the cost standpoint since their preparation requires use of larger quantities of the more expensive, less reactive, propionic acid.

In order to be suitable for use in this invention, the primary esters must contain combined sulfate. Hydrolysis of sulfate-free primary esters, obtained by removal of combined sulfate or through use of an esterification catalyst other than sulfuric acid or its derivatives, occurs very slowly. If sufficiently drastic conditions are used, products containing 0.2 to 1 free hydroxyl group per glucose unit can be obtained, but they are not soluble in acetone or even in acetic acid, a solvent for the original primary ester. The amount of combined sulfate may be between 0.1% and 3.0% based on the weight of the primary ester. Hydrolysis of products containing less than 0.1% combined sulfate requires a longer reaction time and leads to products of inferior quality. Although primary esters containing more than 3% combined sulfate can be converted to acetone-soluble products by heterogeneous hydrolysis, their use leads to lower molecular weight secondary esters. Fibrous esterification products containing from 0.3% to 0.8% combined sulfate are particularly preferred, since they are readily hydrolyzed in aqueous mineral acids and lead to good quality, high molecular weight, secondary esters which give smooth solutions in acetone. Furthermore, primary esters containing from 0.3% to 0.8% combined sulfate are readily prepared by procedures which lead to high molecular weight primary esters in a short time.

Any strong acid such as nitric, sulfuric, hydrochloric, phosphoric, or p-toluenesulfonic acid can be used in the hydrolysis step. Oxygenated mineral acids are preferred, as their use leads to superior products. Sulfuric acid is outstanding in that it brings about the necessary degree of hydrolysis in a short period of time with little or no degradation and is easily handled in conventional equipment.

The concentration of the aqueous acid used as a hydrolytic medium can be varied over wide limits. Concentrations of 0.05% to 50% of the acid are generally employed. The particular concentration will depend upon other reaction conditions such as temperature, and the particular acid employed. A concentration range of 0.5% to 25% of the acid is preferred, since this results in a fairly rapid rate of hydrolysis with little or no degradation. At temperatures in the range of 20° C. to 80° C., an acid concentration of 2% to 10% is particularly preferred since it leads to products of superior quality in a short time. The amount of acid solution used should be at least equal to the weight of the triester and preferably larger quantities are used in order to favor a more uniform reaction. The upper limit on the amount of acid solution employed is governed only by the economies of the process.

The reaction temperature can be varied from 0° C. to 150° C. or even higher. Temperatures below 15° C. are undesirable because of the slow reaction time. Temperatures above 100° C. require more complicated apparatus and are much more likely to bring about degradation of the cellulose chain. Temperatures in the range of 20° C. to 80° C. are preferred because good quality, high molecular weight products are readily obtained under these conditions.

The time of hydrolysis will, of course, vary with the degree of hydrolysis desired, the temperature, acid concentration, and the particular acid employed. In general, the reaction will be complete in 0.5 to 48 hours, although longer or shorter times can be used. The hydrolysis reaction is continued until the product becomes acetone-soluble and is terminated before the hydrolysis has proceeded so far that the secondary ester is no longer soluble in acetone. In general, the hydrolysis is carried out so that the resulting secondary ester contains between 0.1 and 1.0 free hydroxyl group per glucose unit. Hydrolytic procedures leading to products having from 0.2 to 0.8 free hydroxyl group per glucose unit are preferred since these products are of outstanding utility.

The secondary esters obtained by heterogeneous hydrolysis contain varying amounts of combined sulfate. The stability of such products is improved by treatment with superheated steam as illustrated in the examples, or by use of any of the well known stabilizers for cellulose esters. The amount of combined sulfate in the secondary esters varies with the sulfate content of the primary ester and also with the hydrolytic conditions used. For example, when the hydrolysis is conducted at room temperature, little if any combined sulfate is removed, while at high temperatures, for example at 100° C., removal of sulfate is essentially complete in a reasonable length of time.

The fibrous, secondary cellulose acetate propionates and related products of this invention are useful as films, fibers, molded articles, and as ingredients of coating compositions. The physical form of these cellulose esters is particularly desirable. For example, they dissolve much more readily than the usual commercial flake and can be readily transferred without loss through dusting.

Any departure from the above description which conforms to the present invention is intended to be included within the scope of the claims.

I claim:

1. A process for preparing an acetone-soluble secondary cellulose mixed ester which comprises heterogeneously hydrolyzing a fibrous, primary cellulose mixed ester by treating said primary ester in a hydrolyzing medium with a dilute strong acid, said primary ester containing combined sulfate, combined acetic acid and from 2% to 7% combined carboxylic acid having from 3 to 6 carbon atoms; continuing said treatment until a fibrous, acetone-soluble secondary cellulose mixed ester is obtained; and removing thereupon said fibrous, secondary ester from said hydrolyzing medium.

2. A process for preparing an acetone-soluble secondary cellulose ester which comprises heterogeneously hydrolyzing a fibrous, primary cellulose mixed ester by treating said primary ester in a hydrolyzing medium with a dilute strong mineral acid, said primary ester having been prepared from water-activated cotton linters and containing combined sulfate, combined acetic acid and from 2% to 7% combined carboxylic acid having from 3 to 6 carbon atoms; continuing said treatment until a fibrous, acetone-soluble secondary cellulose mixed ester is obtained; and removing thereupon said fibrous, secondary ester from said hydrolyzing medium.

3. A process in accordance with claim 2 in which said primary ester is cellulose acetate propionate and said combined carboxylic acid is propionic acid.

4. A process in accordance with claim 2 in which said primary ester is cellulose acetate propionate; said combined carboxylic acid is propionic acid; and said treatment is carried out at a temperature of 20° C. to 80° C.

5. A process for preparing an acetone-soluble secondary cellulose mixed ester which comprises heterogeneously hydrolyzing a fibrous, primary cellulose mixed ester by treating said primary ester in a hydrolyzing medium with a dilute strong mineral acid, said primary ester containing combined sulfate, combined acetic acid and from 2% to 7% combined carboxylic acid having from 3 to 6 carbon atoms; continuing said treatment until a fibrous, acetone-soluble secondary cellulose mixed ester is obtained having from 2.2 to 2.8 acyl groups per glucose unit; and removing thereupon said fibrous, secondary ester from said hydrolyzing medium.

6. A process in accordance with claim 5 in which said fibrous, secondary ester after removal from said hydrolyzing medium is washed with demineralized water and then treated with super-heated steam, thereby removing combined sulfate.

7. A process for preparing an acetone-soluble cellulose acetate propionate which comprises heterogeneously hydrolyzing a fibrous primary cellulose acetate propionate by heating said primary ester in aqueous 2% to 10% sulfuric acid at a temperature of from 20° C. to 80° C., said primary ester containing from 2% to 7% combined propionic acid and from 0.3% to 0.8% combined sulfuric acid; continuing said heating until an acetone-soluble, fibrous cellulose acetate propionate is obtained containing from 0.2 to 0.8 free hydroxyl groups per glucose unit; removing thereupon said acetone-soluble ester; and treating it with super-heated steam until it is essentially free of combined sulfate.

WILLIAM JAMES BURKE.

REFERENCES CITED

The following references are of record in the file of this patent:

UNITED STATES PATENTS

| Number | Name | Date |
|---|---|---|
| 1,916,689 | Schneider | July 4, 1933 |
| 2,005,383 | Murray | June 18, 1935 |
| 2,028,762 | Dreyfus | Jan. 28, 1936 |
| 2,105,252 | Malm | Jan. 11, 1938 |
| 2,365,258 | Farguhar | Dec. 19, 1944 |